July 31, 1951  J. C. FROMMER  2,562,181
METHOD AND MEANS FOR DETECTING CLOUDINESS
OF TRANSPARENT MATERIAL
Filed Nov. 5, 1948  4 Sheets-Sheet 1

INVENTOR.
JOSEPH C. FROMMER
BY

INVENTOR.
JOSEPH C. FROMMER

INVENTOR.
JOSEPH C. FROMMER
BY

INVENTOR.
JOSEPH C. FROMMER
BY

Patented July 31, 1951

2,562,181

UNITED STATES PATENT OFFICE 2,562,181

METHOD AND MEANS FOR DETECTING CLOUDINESS OF TRANSPARENT MATERIAL

Joseph C. Frommer, Cincinnati, Ohio

Application November 5, 1948, Serial No. 58,423

20 Claims. (Cl. 250—218)

This invention relates to the detection of cloudiness of transparent media, such as gases, liquids, or solids.

If an object is observed through a clear transparent medium, this object appears sharply defined. If the medium contains suspended particles, the sharp contour lines will be blurred. In the following description a medium which passes blurred images will be referred to as a cloudy medium and by more or less cloudiness there will be understood more or less blurring of the image formed under given conditions across a certain thickness of such medium. Conversely, by clarity of a medium there is meant its capability of transmitting clear images and by more or less clarity is meant sharper or less sharp definition of images formed across such medium.

This invention has for one of its primary objects the detection of suspended foreign materials in liquids or gases indicated by the cloudiness caused by such suspensions but it lends itself also to the detection of other phenomena, whether physical or chemical, causing blurring of images transmitted through the medium to be investigated.

The information obtained from such detection can be used to actuate some signal, alarm, automatic correcting or other device; to give quantitative information on the amount of cloudiness; to actuate some automatic device in response to changes of the amount of cloudiness; or for some other similar purpose.

Cloudiness of transparent media is ordinarily accompanied by a reduction of the total amount of light transmitted across a certain thickness of the material under investigation. This reduction of light transmission is sometimes great enough to be measured by ordinary photoelectric means; for certain uses, however, especially in the chemical industry, it would be necessary to detect cloudiness also when such cloudiness is accompanied by a variation in light transmission far below that which would be caused by random variations of the light absorption of the material under investigation. It is an object of the invention to provide a method and means for detecting also such cloudiness as will cause only a negligible decrease of light transmission.

Another object of the invention is to provide a device sensitive to variations of cloudiness but not sensitive to variations of light absorption of transparent media.

A further object of the invention is to cause the modulation of light falling on a photoelectric cell to change substantially with the cloudiness of the material under test.

A further object of the invention is to provide a photoelectric amplifier that gives a signal depending on the modulation of light reaching the photoelectric cell but substantially independent of the average amount of illumination.

A further object of the invention is to provide an optical system suitable for one or more of the purposes outlined above which does not require readjustment of the apparatus if materials having different indices of refraction are tested.

Another object of the invention is to provide the optical system with reflecting means which allows the placement of at least all those optical parts, the relative position of which toward each other is critical, on one side of the medium to be tested.

Another object of the invention is to provide a system that gives a quantitative indication of the cloudiness of the medium under test.

Another object of the invention is to provide a system that will initiate an action depending in magnitude on the quantitative amount of cloudiness of the medium under test.

Another object of the invention is to provide optical targets suitable for the purposes outlined above.

Still another object of the invention is to measure cloudiness by focusing light on sharply defined areas having at least one dimension small compared to the distance of these areas from the objective lens (or mirror) that focuses the light on them, and to detect the light scattered due to cloudiness on nearby areas on which no light was focused.

Several embodiments of the invention are illustrated by way of example in the accompanying drawings, in which.

Figure 1:
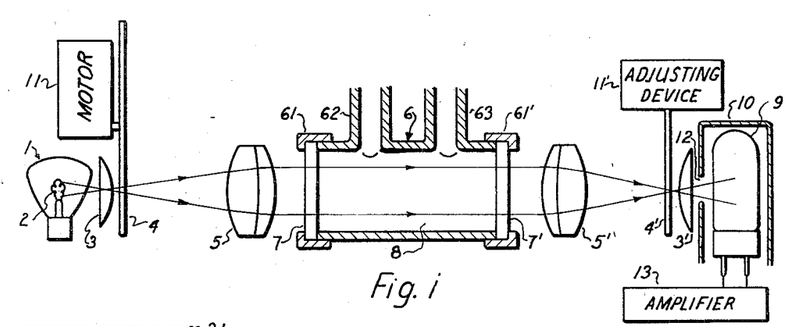
Fig. 1 shows in elevation, partly in section, an optical system according to one form of the invention.

Referring first to Fig. 1, 1 denotes a lamp having a filament 2, 3 is a condenser lens, 4 a first optical target, 5 a first objective lens, and 6 a container carrying the medium 8 to be investigated. The container 6 has two plan-parallel, transparent walls 7 and 7', 5' denotes a second objective lens, 4' a second target, 3' a second condenser lens, 9 a photoelectric cell surrounded by a shield 10 having a hole 12, 11 a motor adapted to move the target 4 when coupled therewith, 11' an adjusting device, and 13 an amplifier. The first optical target 4 is situated in the focal plane of the first objective lens 5 and the second target 4' in the focal plane of the second objective lens 5'. The term "target" as used in this description denotes an optical element having transparent and dark portions, the term "transparent" denoting in this connection an area or areas of the target capable of directing light coming from a light source towards a photoelectric cell, and the term "dark" denoting an area or areas of the same target capable of preventing said light from said light source to travel towards said photoelectric cell.

Figure 2:
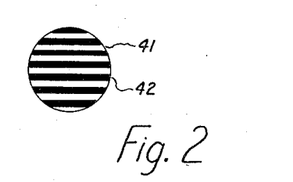
Figs. 2, 3, 4, 5, and 6 represent various forms of optical targets.

When the target 4 is illuminated by the lamp 1, its image is thrown into infinity by the objective lens 5. The rays carrying this image traverse the medium 8 and are refocused by the objective lens 5' into the plane of the second target 4'. The targets 4 and 4' may comprise alternating transparent and dark areas in the form of parallel clear stripes 41 and opaque stripes 42 as shown in Fig. 2. The patterns of the targets 4 and 4' are so laid out that, assuming the motor 11 to be at rest in a certain position, the images of all transparent portions of 4 fall on dark portions of 4'. Therefore, as long as the medium 8 is entirely clear (assuming ideal optical conditions throughout the system), no light will reach the photoelectric cell 9. If, however, the medium 8 becomes cloudy, the light rays traversing it are deflected from their original course and some of the rays focused on the dark portions of the second target 4' will reach instead the transparent portions thereof. Thus, a certain amount of light reaches the photoelectric cell 9, and the amount of this light is a measure of the cloudiness of the medium 8.

It will be noted that by holding the motor 11 at a standstill in another position it would also be possible to focus the transparent portions of 4 on the transparent portions of 4', in which case cloudiness of the medium 8 would cause a decrease of the light falling on the cell 9, but in general it is preferable to focus the transparent portions of 4 on the dark portions of 4' because the change caused by a certain amount of variation of light is more readily detected if the change occurs from entire or almost entire darkness than if it occurs from a high level of illumination.

The photoelectric current obtained in 9 can be amplified by any known method; its value can be indicated by a meter; it can be recorded; it can actuate correcting means or signalling means; or it may serve any other desired function.

The motor 11 is of such a nature as to move the target 4, when coupled with the latter, in the plane of this target in such a way that the transparent portions of 4 are focused alternatingly on transparent and dark portions of 4'. With a target as illustrated in Fig. 2, a mechanical vibrator is used as the motor 11. The height of the vibrations may most advantageously be equal to one full pitch of the target pattern so that during each stroke there will be alternation from full coincidence of the image of the transparent portion of 4 with the transparent portions of 4' to full coincidence of the image of said transparent portions of 4 with the dark portions of 4'.

Figures 8, 9, 10, 11:
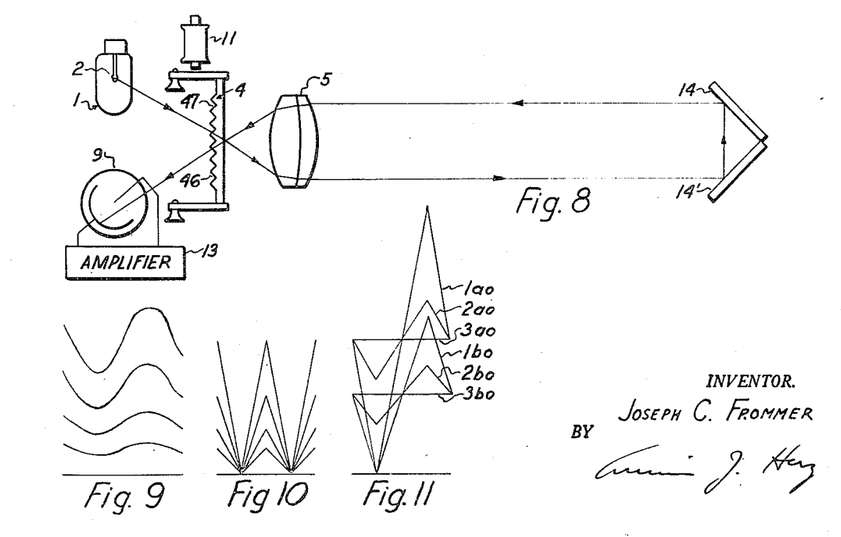
Fig. 9 represents time curves of the light output obtainable from an incandescent lamp fed by alternating current.
Fig. 10 represents time curves of light obtainable by chopping the output of a constant source of light.
Fig. 11 represents time curves of a photoelectric signal.

As long as the medium 8 is clear there will be theoretically zero illumination of the phototube 9 during the coverage of transparent with dark and maximum (full) illumination during the coverage of transparent with transparent, and the photoelectric signal generated by the phototube will be as represented schematically by the curve $1ao$ or the curve $1bo$ of Fig. 11. If the medium 8 becomes cloudy then some of the rays focused toward the dark portions in the "dark" period will be diverted to transparent portions and some of the rays focused toward the transparent portions during the "light" period will be diverted toward dark portions. Accordingly, the maximum of illumination decreases and the minimum thereof increases as compared with the conditions which exist when the medium 8 is clear and the signal at the phototube assumes the shapes shown schematically at $2ao$ and $2bo$ in Fig. 11. If the cloudiness is so heavy that the image formed at 4' is entirely blurred, then the light reaching the phototube will stay constant during the entire cycle of vibration and the photoelectric signal will be as shown in Fig. 11 at $3ao$ and $3bo$ (horizontal lines).

One example of an application of the invention be described now: Light is produced by one filament of a type 2330 Mazda Lamp arranged in front of a plano-convex lens 3 and is thrown by this lens onto a ½" diameter first target 4 at a distance of 1½" from said lamp filament. The target 4 has alternating light and dark stripes of .0075" width which may have been obtained for instance by the reproduction of a magnified drawing of the pattern on photographic film. The target is held in the focal plane of a color corrected lens 5 of 32 mm. diameter and 122 mm. focal length. The second target 4' and the second objective lens 5' are respectively identical with 4 and 5. The container 6 of 10" in length has a clear diameter of 1¼" and contains the media to be tested, which in the experiment referred to was in one case oleic acid and in the other case mineral oil. For certain chemical purposes these chemicals must be of a very high purity and the presence of for instance $1/25$ of 1% of suspended activated bleached earth, called "Filtrol," would make either of these chemicals unsuitable for their purposes even though the addition of so small an amount of Filtrol causes only so slight a reduction of the light transmission that with ordinary photoelectric means I was unable to measure this reduction in transmission. As it is well known, commercial oleic acid is a dark red or yellow liquid, whereas mineral oil is colorless. With this arrangement:

(a) the average light obtained on the phototube across oleic acid is materially different (less) from the average light obtained on the phototube across mineral oil;

(b) the relative modulation obtained from air, clear oleic acid, and clear mineral oil is in all three cases the same. By relative modulation there is understood a number proportional to the ratio between peak to peak variation of the photoelectric signal and the average value of the signal; and (c) the relative modulation obtained with oleic acid or mineral oil containing less than 1/25 of 1% of Filtrol falls well below half of the relative modulation obtained with the clear chemical.

If it is desired that the apparatus should not require readjustment whenever a substance of different absorption is to be tested, then an amplifier should be used which is responsive to relative modulation only. An amplifier of this kind will be described later with reference to Fig. 17.

The amplification of alternating voltages is easier than the amplification of direct voltages and photoelectric amplifiers are often designed to take advantage of the modulation present in the light output of incandescent lamps fed by alternating current. Fig. 9 illustrates schematically what may be called the "natural" modulation of light emitted by an incandescent lamp fed by alternating current. With lamps fed at the line frequency of 60 cycles the natural modulation is only in the order of 10%. Therefore, to obtain light which is substantially higher modulated, mechanical choppers are used quite often that alternatingly interrupt the light from a constant light source. Such conventional choppers would, however, not be suitable for producing the result required in the present invention because they would afford no discrimination between the variations of the photoelectric signal caused by variations in light absorption of the medium 8 on the one hand and variations caused by cloudiness on the other hand, the relative modulation remaining constant with such conventional methods of modulating the signal. In contrast thereto the method according to the present invention, which makes relative modulation dependent on the cloudiness of the medium to be tested, gives the desired discrimination above mentioned, absorption affecting in this case only the average photoelectric current, and cloudiness affecting only the relative modulation.

Another important feature of the invention resides in that the two targets are arranged in the focal planes of the respective objective lenses and therefore the loci of the images of the targets in the space between the two objective lenses are in infinity. This feature allows the use of the same equipment for the testing of materials having widely different indices of refraction without the need of different adjustment of the optical system for such different media. Generally speaking, changes in the index of refraction of the space through which the rays travel will cause a change of the focusing distance, the difference being the larger the smaller the focusing distance itself is. The error decreases with increasing focusing distance and it becomes zero if the image is focused into infinity as is the case in the present invention where the targets are situated in the focal planes of their coordinated objectives. While the condensing lenses 3 and 3' are not indispensable, the lens 3 improves the efficiency of the illumination of the target 4 and the lens 3' allows to place the phototube 9 at a more convenient spot and to better protect it against outside light. Best results are obtained from the first condenser lens 3 if it causes the image of the filament 2 to appear midway between 5 and 5'. The position of such image will necessarily vary when the medium 8 is changed to one having a different index of refraction and therefore for best results, this image should be focused to that midpoint between 5 and 5' for an average index of refraction.

Figure 3:
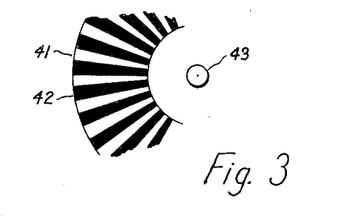

The oscillatory movement of the target 4 can be replaced by a rotary movement if patterns are used on the targets 4 and 4' that have circular symmetry. A portion of such a pattern is shown in Fig. 3. It contains radial segments which are alternatingly transparent 41 and dark 42. It can be rotated around its axis of symmetry 43 by the motor 11.

Figure 4:
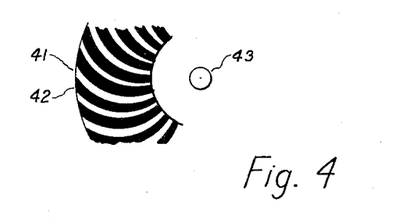

The width of the stripes of the pattern shown in Fig. 3 varies in the radial direction. For numerical definition of cloudiness it is an advantage to refer to blurring of stripes of uniform width. Centrally symmetrical stripes of uniform width can be obtained by evolvents as shown schematically in Fig. 4.

Figure 5:
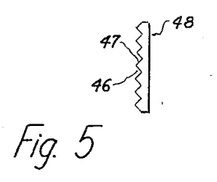

Light can be caused to reach or not to reach the photo cell 9 not only by the use of transparent and dark areas on the targets 4 and 4', but also by forming on them areas that divert the light into different directions by reflection or refraction. A target of such nature is shown in Fig. 5 in front view and in Fig. 6 in elevation. This target is made of a piece of transparent material, preferably glass, whose one side, 48, is flat, and whose other side has parallel furrows. The sides 46, 47 of these furrows with the common flat side 48 form small prisms that divert parallel rays toward one direction or the other, according to the inclination of the furrow walls.

Figure 6:
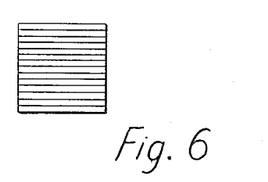
Figure 7:
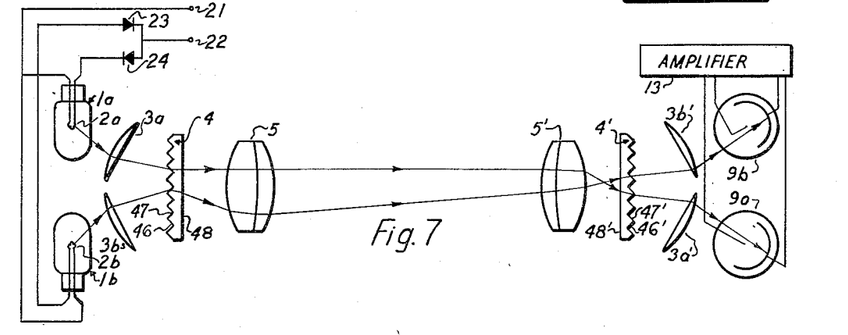
Figs. 7 and 8 show two modified optical systems.

Fig. 7 illustrates an application of such targets as shown in Figs. 5 and 6. This embodiment of the invention comprises two lamps, $1a$ and $1b$, having filaments $2a$ and $2b$, two first condenser lenses $3a$ and $3b$, a first target 4, a first objective lens 5, a second objective lens 5', a second target 4', two second condenser lenses $3a'$ and $3b'$, and two phototubes $9a$ and $9b$. The targets 4 and 4' are placed in the focal planes of 5 and 5', respectively, and so adjusted that the images of all furrow walls 46 of 4 slanting one way are focused on furrow walls 46' of 4' and the images of all furrow walls 47 slanting the other way are focused on the furrow walls 47' of 4'. The filaments $2a$ and $2b$ are so arranged that the objective 5 is reached by light emanating from filament $2a$ across furrow walls 46, and by rays emanating from $2b$ across furrow walls 47. The photoelectric cells $9a$ and $9b$ are so positioned that $9a$ is in the path of those rays of the light from 5' which reach the furrow walls 46' and are diverted thereby whereas $9b$ is in the path of those rays which reach the furrow walls 47' and are diverted by these walls. Consequently, as long as the medium between 5 and 5' is clear, the phototube $9a$ is illuminated only by light from $2a$ and the phototube $9b$ is illuminated only by light from $2b$. $2a$ and $2b$ are connected to the alternating voltage source 21, 22 across rectifiers 23, 24 connected in opposite polarity so that one filament draws current only during one half period of the alternating voltage cycle, and the other filament draws current only during the other half period. Corresponding to the modulation of these sources of light the signal on the two phototubes will be modulated in opposite phase. If, however, the medium between the objectives 5 and 5' is cloudy, then part of the light focused originally on one set of furrow walls will be dispersed toward the other set and the two opposite modulations will tend to compensate each other causing diminution of the relative modulation of both phototubes. If the absorption of the medium between 5 and 5' changes, the light falling on both phototubes will change proportionally, but the relative modulation will remain unaltered. Again an amplifier, generally indicated at 13, may perform the amplification necessary for a desired indication or other action in function of said modulation.

The maintenance of the exact relative position of the targets 4 and 4' to each other and to the lenses 5 and 5' is critical in the embodiment shown in Fig. 7, because a slight change in this relative position may cause a material portion of the light originally focused on one set of furrow walls of 4' to fall on the other set. In the embodiment illustrated in Fig. 8 the light of the filament 2 which falls on one set of the furrow walls of the target 4 is directed by the objective lens 5 across the medium to be investigated (not shown in this figure) and is then reflected by two mirrors 14 and 14' across the same medium back to objective 5. The two mirrors 14 and 14' are positioned at exactly 90° to each other and have the line of intersection of their planes parallel to the furrows on 4. According to the position of 4 with respect to the optical axis of 5 light rays emitted by the filament 2 which are directed by the furrow walls 47 toward the objective 5 are refocused either entirely, partially or not at all on furrow walls 46 of 4, and these furrow walls 46 direct the light coming from the objective lens 5 toward the phototube 9. The target 4 serves in this case also the function for which in the previously described embodiment the second target 4' is provided. The motor 11, which may be any mechanical oscillating device, causes the target 4 to vibrate in its own plane and thereby to alternatingly increase and decrease the illumination of 9. Upon the medium between 5 and mirrors 14 and 14' becoming cloudy, the sharpness of focusing and the modulation of the photoelectric signal will decrease. This system of Fig. 8 has the advantage of not being sensitive to slight displacements of the mirrors 14 and 14' relative to the rest of the optical system, so long as these mirrors remain in exact relation to each other: in the plane of the drawing, the movement of one mirror is compensated by the equal movement of the other, and in the plane perpendicular to the plane of the drawing the exact alignment is not critical, as slight misalignment would merely focus rays destined for a certain point of a furrow wall to another point of the same furrow wall. A single mirror may be used instead of the two mirrors 14 and 14' if this single mirror is mechanically mounted so that displacements of the mirror relative to the other parts of the optical systems will not occur.

The two individual advantages of the two embodiments just described with reference to Figs. 7 and 8, i. e. absence of moving parts in the case of Fig. 7 and insensitivity to slight displacements of the parts on one side of the medium to be investigated relative to the parts on the other side of said medium in the case of Fig. 8, are combined in the optical system represented in Figs. 12 and 13. In these figures the reference numerals 1a and 1b again denote lamps, 9a and 9b phototubes, 5 an objective lens, and 4 a target, whereas 3a, 3b, 3a' and 3b' denote condenser lenses and 14 denotes a prism whose back sides 144 and 145 are silvered. The medium 8 to be tested is kept in the chamber 6 having plan parallel windows 7 and 7' held in place by a flange 61 and by a cap 64. The cap 64 also protects the prism 14. The target 4 has on one side parallel furrows with walls 46 and 47 and on its other side two prisms 48, 48' which divert the passage of rays upwardly and downwardly. The diversion by the prisms 48, 48' is effected in a plane which is perpendicular to the plane in which the furrow walls 46, 47 divert the light. Whilst the prisms 48, 48' divert light from both lamps 1a and 1b across the upper half of the optics, and the light reflected to the lower half of the optics down toward the two phototubes 9a and 9b, the furrow walls 46 and 47 direct the light from one lamp toward one phototube and from the other lamp toward the other phototube. The light of 1a and 1b is modulated in opposite phase, e. g. by having the filaments 2a and 2b fed from an AC voltage source across rectifiers in opposite polarities. Consequently, as in the embodiment illustrated in Fig. 7, the two phototubes are illuminated by light modulated in opposite phase as long as the medium 8 is clear, and this modulation decreases if the medium gets cloudy.

Figures 14, 15, 16:
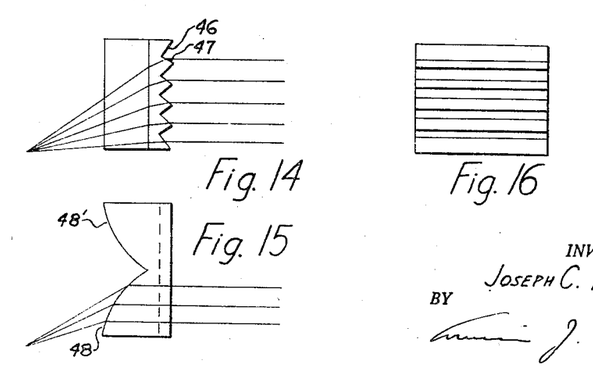
Figs. 14, 15, and 16 show, respectively, in an elevation, a side view and a plan view a modified optical target.

The function of the condenser lenses 3a, 3b, 3a' and 3b' may be performed by the target 4 if the angles of the furrow walls 46, 47 are so staggered that the small prisms formed by them will concentrate parallel rays into the desired focus, and the two prisms 48, 48' on the back side are given a curvature to perform such focusing in the other plane. Figs. 14, 15 and 16 show schematically a target 4 shaped in this manner.

Figure 17:
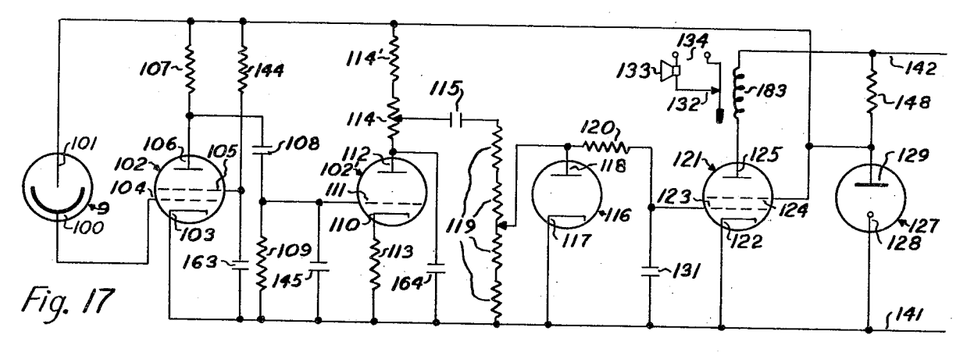
Fig. 17 shows an amplifier circuit.

The previously described optical systems of Figs. 1 and 8; if their targets are oscillated or rotated, provide an alternating photoelectric signal the modulation of which is the higher the clearer the medium 8 under test is, and a conventional amplifier may be used in connection with these optical systems. However, if an indication is wanted which is indicative of cloudiness alone by being independent of the absorption of the medium, then a circuit has to be used which is responsive to the relative modulation of the photoelectric signal only, i. e. to the proportion between the alternating and the average photoelectric current. Fig. 17 shows an amplifier answering this requirement of being responsive to the relative modulation only. This amplifier contains a photoelectric cell 9 having a cathode 100 and an anode 101; a first amplifier tube 102 having a cathode 103, a first grid 104, one or more additional grids of which one is shown at 105, and an anode 106; a second amplifier tube 102' having a cathode 110, a grid 111, and an anode 112; a diode 116 having a cathode 117 and an anode 118; a last amplifier tube 121 having a cathode 122, a first grid 123, one or more additional grids of which one is shown at 124, and an anode 125; and a voltage stabilizer tube 127 having a cathode 128 and an anode 129. The heaters of the amplifier tubes are fed from a conventional source of heater current, not shown, which may be held constant by some conventional voltage or current regulator, and a conventional supply of plate voltage, not shown, provides plate voltage, whose negative terminal is indicated at 141 and whose positive terminal is indicated at 142. The cathode 103 of tube 102 is connected to the negative terminal 141 of the B-supply and its anode is connected across a load resistor 107 to the plate 129 of the voltage regulator 127. The anode 101 of the phototube 9 is connected directly to the plate 129 of 127, whereas the cathode 100 of the phototube 9 is connected to grid 104 of tube 102. The screen grid 105 of tube 102 is connected across a resistor 144 to the plate 129 of the voltage regulator tube 127 and across the condenser 163 to the negative terminal 141 of the B-supply. The second tube 102' has connected its cathode 110 across a resistor 113 to the negative terminal 141 of the B-supply, its grid 111 across a condenser 145 and a resistor 109 to line 141 and its plate 112 across resistors 114 and 114' to the plate 129 of the voltage regulator 127. The cathode 117 of the diode 116 is connected to the negative terminal 141 of the B-supply, and its anode 118 is connected to a tap on a bank of resistors 119 extending between line 141 and a condenser 115, the other terminal of the latter being connected to a tap on a resistor 114. The grid 123 of the last amplifier tube 121 is connected through a resistor 120 to the anode 118 of the diode 116 and across a condenser 131 to 141. The cathode 122 of tube 121 is connected to 141 and its second grid 124 to the plate 129 of the stabilizer tube 127, whereas its anode 125 is connected across a relay 183 to the positive terminal 142 of the B-supply. The relay 183 has a normally closed contact 132, which is connected between a voltage source 134 and a signal device 133. It will be noted that the cathode 100 of the cell 9 is connected to no other point than to the grid 104 of the first tube 102 and that therefore the photoelectric current passes between grid 104 and cathode 103 of this tube, allowing that grid to become positive with respect to its potential for zero current by as much as corresponds to the amount of photoelectric current passing. The relation between grid voltage and grid current is expressed by the equation:

$$I_g = I_0 e^{(V-V_0)/U}$$

in which $I_g$ stands for the grid current, $e$ for the base of the natural logarithms and $V$ for the voltage difference between grid and cathode and in which $I_0$ is a constant (dimension current) and $V_0$ and $U$ are other constants (dimension voltage), all depending on the tube characteristics and the temperature of the cathode. The above expression can be written:

$$V - V_0 = U \log (I_g/I_0) = U \log I_g - U \log I_0$$

Thus, if the grid current varies between the values $I_{g1}$ and $I_{g2}$, the voltage will vary between the limits:

$$V_1 = V_0 + U \log I_{g1} - U \log I_{g0}$$
$$V_2 = V_0 + U \log I_{g2} - U \log I_{g0}$$

and the variation in voltage will be $$V_1 - V_2 = U \log I_{g1} - U \log I_{g2} = U \log (I_{g1}/I_{g2})$$

It will be seen that the variation in voltage obtained on the grid 104 depends only on the proportion between $I_{g1}$ and $I_{g2}$ and not on the absolute values of these currents. The above formula would yield infinite negative swing for $I_g = 0$. Actually, creeping currents prevent the grid from becoming more negative than about $-1$ volt under any practical conditions. That limitation would still destroy the independence from average level of illumination were it not that even with the utmost care the illumination at theoretically zero will be in the order of 20% of the average illumination. Should the optics be perfected so as to give too low minimum levels, the pattern could always be designed so that a high enough level of illumination is maintained at the minimum points.

The rest of the circuit of Fig. 17 is conventional. The alternating voltage generated on the plate 106 is further amplified in the triode 102', and detected in the diode 116. The output of that diode is filtered by the resistor 120 and condenser 131 and brought to the grid of the third amplifier tube 121. According to the points at which the resistor bank 119 and the resistor 114 (serving for fine adjustment) are tapped off, it will take a certain amount of relative modulation to generate a sufficiently high negative voltage on grid 123 of the third amplifier tube 121 to cut off its current and cause the relay 183 to drop out and close contact 132. Condensers 145 and 164 serve to suppress unwanted alternating voltages, e. g. those that are caused by the natural modulation of the lamp 1 if the modulation of focusing is done at a frequency substantially lower than 120 C. P. S.

Figure 12:
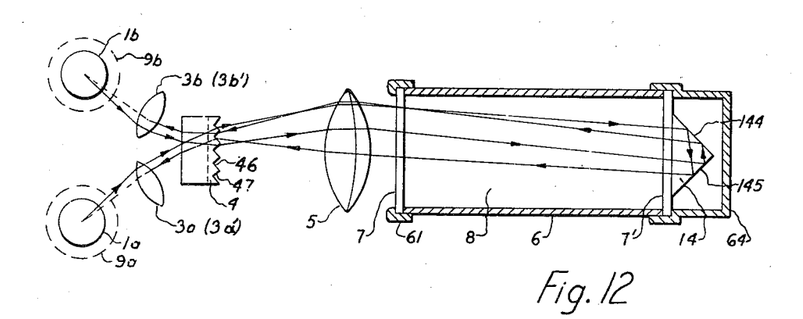
Fig. 12 is a plan view and Fig. 13 is an elevational view of another modified optical system.
Figure 13:
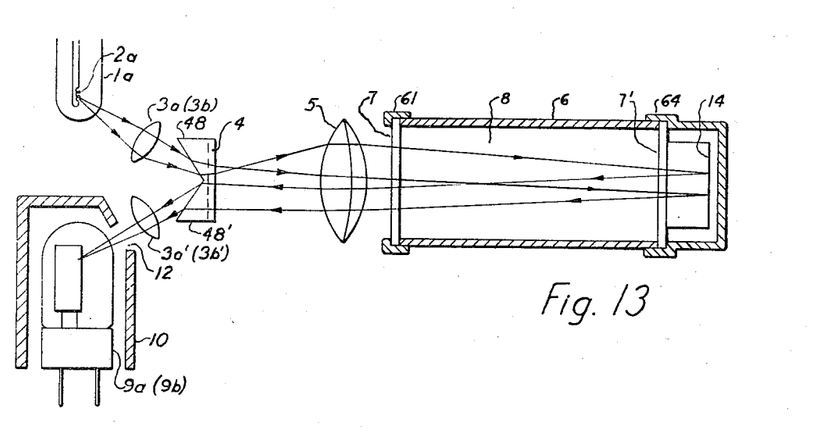
Figure 18:
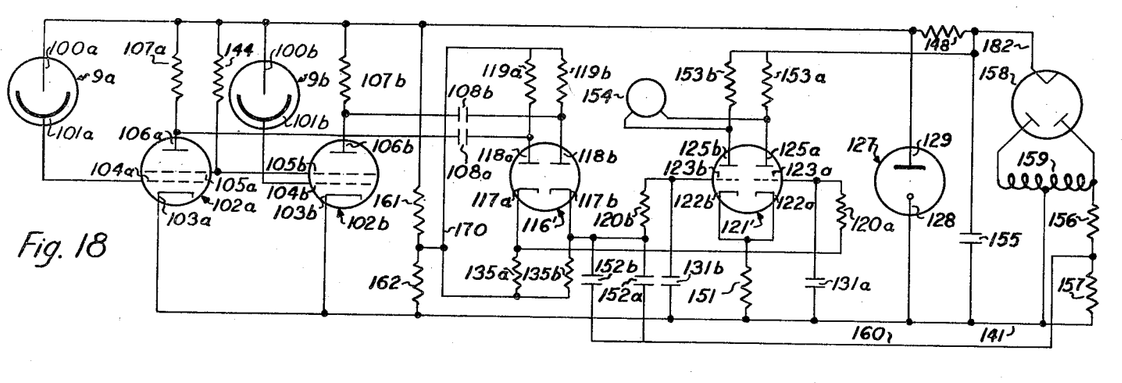
Fig. 18 illustrates a modification of the circuit shown in Fig. 17.

The amplifier circuit of Fig. 17 may also be used in connection with the optical systems illustrated in Figs. 7, 12 and 13, by connecting either phototube 9a or 9b of said optical systems in place of phototube 9 of Fig. 17. The other phototube could then be omitted. But better results, especially the elimination of errors caused by a difference in light emission of the two lamps 1a and 1b, are obtainable by amplifying the signals of both phototubes 9a and 9b. An amplifier doing this and at the same time taking advantage of the fact that in the systems of Figs. 7 and 12 and 13 the modulation of light occurs at line frequency is illustrated in Fig. 18. In this circuit, the anodes 100a and 100b of the phototubes 9a and 9b are connected to the plate 129 of the voltage stabilizer tube 127 and their cathodes 101a and 101b to the grid 104a and 104b of the tubes 102a and 102b. The cathodes 103a and 103b of the tubes 102a and 102b are connected to the negative terminal 141 of the B-supply and their screen grids 105a and 105b across a common resistor 144 to the anode 129 of the voltage stabilizer tube 127. The plates of the tubes 102a and 102b are connected across load resistors 107a and 107b to the anode 129 of the voltage stabilizer tube 127 and through condensers 108a and 108b to the anodes 118a and 118b of a double diode 116'. The cathodes 117a and 117b of this double diode 116' are connected across condensers 152a and 152b to a line 160 which is held at an alternating voltage with respect to the negative end 141 of the B-supply, said alternating voltage being derived from a power transformer 159 (whose conventional other windings are not shown) by a voltage divider 156, 157. All four electrodes of said twin diode 116' are also connected across resistors 119a, 119b, 135a and 135b to a point 170 which is held at a positive voltage with respect to the negative end 141 of the B-supply by a voltage divider consisting of resistors 161 and 162. The cathodes 117a and 117b of the diode 116 are connected further across resistors 120a and 120b to grids 123a and 123b of a twin amplifier tube 121'. The cathodes 122a and 122b of this twin amplifier tube are connected across a common resistor 151 to the negative terminal of the B-supply and their anodes 125a and 125b across resistors 153a and 153b to the positive terminal 132 of it. Between the anodes 125a and 125b there is connected a meter 154.

In this circuit the phototubes are connected directly to the control grids 104a and 104b of the tubes 102a and 102b, and there is no other path provided for the photoelectric current from the cathodes of the phototubes. Therefore, in analogy to what was pointed out in connection with Fig. 17, the alternating signal obtained on the control grids will be a function of the relative modulation of the light falling on the phototubes, and hence of the cloudiness of the medium under test. The signal on these grids is amplified on the plates 106a and 106b and brought through condensers 108a and 108b to the plates 118a and 118b of the twin diode 116'. Each diode of the twin diode 116' has between its respective cathode and anode the algebraic sum of the alternating voltages applied to these electrodes. As the alternating voltages impressed on the cathodes are equal, these algebraic sums will be equal to each other if there is no modulation present on the anodes, and they will be altered in opposite directions if modulation of equal and opposite directions to the alternating voltages applied to the cathodes 117a and 117b is impressed upon the anodes 118a and 118b. It has been shown in connection with Figs. 7 and 12 and 13 that as long as the medium 8 is clear there take place modulations of line frequency and of opposite polarities of the light falling on the phototubes 9a and 9b. These modulations of light will cause alternating voltages of opposite polarity on the grids 104a and 104b and, consequently, alternating voltages of opposite polarity on the anodes 106a and 106b, which, in turn, are transmitted to the anodes 118a and 118b of the double diode 116'. Therefore, the alternating voltage difference between cathode and anode of one diode system will increase and the alternating voltage difference between cathode and anode of the other system will decrease, causing correspondingly higher and lower rectified signals on the cathodes 117a and 117b of the double diode 116'. These rectified signals are transmitted across the resistors 120a and 120b to the grids 123a and 123b of the twin triode 121', causing a corresponding difference in the anode currents flowing in the two systems. This difference, which is the measure of clarity (freedom from cloudiness) of the medium under test, can be read on the meter 154.

Figure 19:
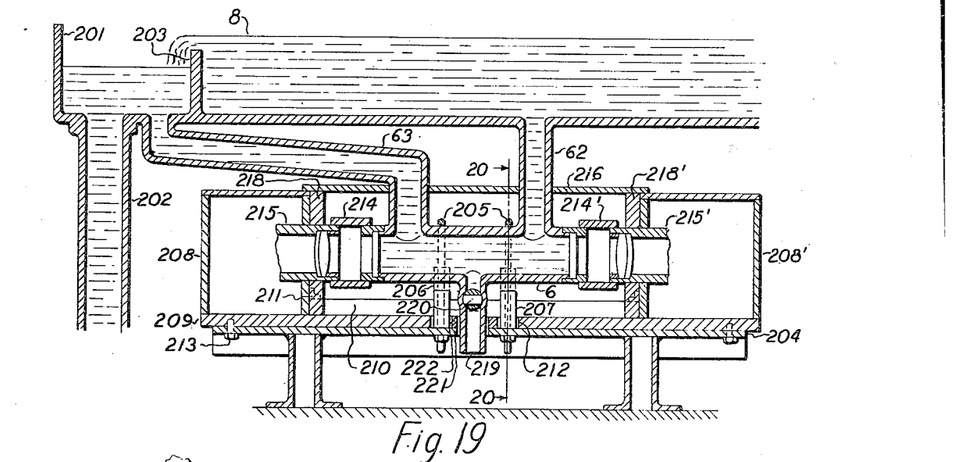
Fig. 19 illustrates in a fragmentary longitudinal section a structural embodiment of a device according to the invention.
Figure 20:
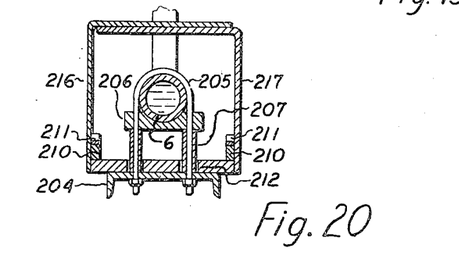
Fig. 20 is a section along the line 20—20 in Fig. 19.

If the device according to the invention is to be used in a chemical plant to test the cloudiness of a liquid flowing in a pipe system, then installation, maintenance, and servicing require that the container 6 be integrally connected to the piping system and that the optical system form one integral part that can be mounted rigidly in a well defined position relative to said container, but which can still be removed without opening the piping connections to the container 6. It is further desirable that fastening of either the container 6 or of the optical assembly should cause no stress that would upset the alignment of the optical system. Figs. 19 and 20 illustrate an installation which complies with the requirements just mentioned in which the liquid 8, which may be filtered through a filter press not shown in the drawing, is gathered in a trough 201 supplying a pipeline 202. To force a substantial portion of the liquid flow across the chamber 6, a dam 203 is provided in the trough 201, and to each side of this dam there is a pipe 62 and 63, respectively, both said pipes 62 and 63 leading to the chamber 6. 204 is a flat table, e. g. in the form of a steel channel fastened securely to the floor of the building or to the base of the filter press. The chamber 6 is fastened to said table 204 by U-bolts 205 resting upon the upper half of the chamber whose lower end is supported by cradles 206, which in turn are held in place by tubular spacers 207 provided around the legs of the U-bolts 205.

The optical system containing lenses, light sources, phototubes, amplifiers, etc. is housed in two housings 208 and 208' that are rigidly held in position with respect to each other by a common bottom 209 and by braces 210. These braces are fastened to the bottom portion 209 in any suitable manner and to the walls of the two housings 207 and 207' by brackets 211. The bottom 209 is provided with four holes 212 to clear the legs of the U-bolts 205 and the spacers 207 provided around these legs. The bottom 209 can be fastened to the table 204, such as by screws 213. To protect the optical portions from dust, dirt and fluids, two flexible or pliable covers 214 and 214' are provided to fit over both the chamber 6 and the tubes 215 and 215' which house the optical systems. Further protection is provided by split covers 216 and 217 that can be fastened from both sides over the space between the two housings 208 and 208', and which are cut out to clear the pipe connections 62 and 63.

The chamber 6 may be heated, if the chemical process so requires. To protect the optical and electronic parts from that heat, the inner walls of the housings 208 and 208' may be lined with heat insulator sheets 218 and 218'. A pipe 219 with a cock 220 is provided to drain the chamber 6, and clearance holes 221 and 222 in the bottom 209 and in the table 204 respectively, allow space for said drain pipe, or the liquid drained out of it.

In most of the embodiments described heretofore the alternating areas that direct light to one phototube or the other, or transmit or absorb light, were substantially parallel stripes. These areas may have other shapes without departing from the invention; they may, for instance, be in the shape of a checker board. Whatever their shape, however, it is preferable to have at least one dimension of such areas small compared with their distance from the objective which focuses their image. According to the degree of cloudiness to be detected this dimension may be chosen smaller or wider, a very good sensitivity for many practical purposes being achieved with such dimension being in the order of $1/100$ or less of said distance from the objective. The dark and transparent portions need not be of equal width; relative modulation can be increased by making the dark portions slightly wider and average illumination may be increased by making the transparent portions wider. A magnified or reduced image of the first target may be projected on a second target of correspondingly larger or smaller size. Focusing of the image by parabolic mirrors or the like, replacing the incandescent lamp by other light sources, diverting the light by rows of inclined mirrors instead of by prisms, keeping the target 4' in motion instead of 4, or other changes in the components or their arrangement may be made without departing from the invention.

What I claim is:

1. A method of detecting cloudiness of a transparent medium, comprising the steps of directing light across the medium to be tested, gathering on a photoelectric cell both a first portion of said light consisting of rays passing through said medium in unbroken straight lines and a second portion of said light consisting of rays diverted from the straight direction of propagation by said cloudiness of said medium, modulating one of said two portions of said light whilst keeping the illumination gathered on said photoelectric cell from said other portion of said light substantially unmodulated, and detecting the relative modulation of the photoelectric current caused by the combined action of said two portions of said light on said photoelectric cell.

2. A method of detecting cloudiness of media having transparency, comprising the steps of directing light from a source onto a first target having transparent and dark portions, focusing an image of said first target across the medium to be tested onto a second target having likewise transparent and dark portions, moving the first target relatively to the second target to vary the incidence of the images of the transparent and dark portions of said first target upon the transparent and dark portions of said second target, and detecting the relative modulation of the light passing both said targets.

3. A method as claimed in claim 2, wherein the first target is moved in its own plane.

4. An apparatus for detecting cloudiness of media having transparency, comprising at least one light source, a first target adapted to be illuminated by said light source, a second target, both said targets having transparent and dark portions, optical means including at least one objective for projecting an image of said first target across the medium to be tested onto said second target, means to periodically vary the incidence of illuminated and dark portions of the image formed by said first target with light and dark portions of said second target and photoelectric means adapted to be influenced by light passing said second target and to detect the relative modulation of said light passing said second target.

5. An apparatus for detecting cloudiness of media having transparency, comprising at least one light source, a first target adapted to be illuminated by said light source, a second target, both said targets having transparent and dark portions, a container for the medium to be tested having at least two transparent walls, optical means including at least one objective for projecting an image of said first target across the medium to be tested onto said second target, means to periodically vary the incidence of illuminated and dark portions of the image formed by said first target with light and dark portions of said second target and photoelectric means adapted to be influenced by light passing said second target and to detect the relative modulation of said light passing said second target.

6. An apparatus for detecting cloudiness of media having transparency, comprising at least one light source, a first target adapted to be illuminated by said light source, a second target, both said targets having transparent and dark portions, a first objective and a second objective disposed so as to contain the medium to be tested between them, said first target being arranged in the focal plane of said first objective and said second target in the focal plane of said second objective, means to periodically vary the incidence of illuminated and dark portions of the image formed by said first target with light and dark portions of said second target and photoelectric means adapted to be influenced by light passing said second target and to detect the relative modulation of said light passing said second target.

7. An apparatus as claimed in claim 4, having means for moving the image of the first target relative to the second target.

8. An apparatus as claimed in claim 4, wherein the two targets have parallel transparent and opaque stripes and means are provided for vibrating at least one of said targets in its own plane in a direction perpendicular to said stripes.

9. An apparatus as claimed in claim 4, wherein the two targets have central-symmetrical transparent and opaque stripes and at least one of said targets is rotatably mounted for being rotated by a motor around its axis of symmetry.

10. An apparatus as claimed in claim 4, wherein the two targets are structurally united into a single target at one side of the medium to be tested and reflecting means are provided at the other side of said medium.

11. An apparatus as claimed in claim 10, wherein said single target has transparent and dark portions in the form of parallel stripes and said reflecting means comprise two reflecting surfaces at a right angle to each other, the line of intersection of said two reflecting surfaces extending parallelly to said parallel stripes.

12. An apparatus as claimed in claim 4, wherein said transparent and dark portions of one or both targets are formed by the inclined surfaces of at least one prism.

13. An apparatus as claimed in claim 4, wherein said transparent and dark portions of one or both targets are formed by the inclined surfaces of a plurality of parallel furrows of a transparent body.

14. An apparatus as claimed in claim 4, wherein the width of the transparent and dark portions of at least one target in at least one direction is small compared with the distance of said target from said objective.

15. An apparatus as claimed in claim 4, wherein the width of the transparent and dark portions of at least one target in at least one direction is smaller than 1/100 of the distance of said target from said objective.

16. An apparatus for detecting cloudiness of media having transparency, comprising two lamps, a source of alternating current, two rectifiers, said two lamps being connected to said source of alternating current across said two rectifiers, said two rectifiers being arranged so as to supply said two lamps with current of opposite polarity, and photoelectric means including at least one phototube arranged in the path of rays emanating from one of said lamps and passing through said medium to be tested in unbroken straight lines, and means adapted to detect the relative modulation of the light falling on said phototube.

17. A method to detect cloudiness of transparent media comprising the steps of causing light from at least one light source to pass across the medium to be tested onto at least one photoelectric cathode, periodically interrupting those rays of said light which pass through said medium in an unbroken straight line for each passage from one end to the other end of said medium, and detecting on said photoelectric cathode the ratio between variations of illumination occurring at the rate at which said rays are periodically interrupted and the average illumination.

18. An apparatus for detecting cloudiness of transparent media, comprising at least one light source, at least one photoelectric cell, optical means to direct light from at least one of said light sources to at least one of said photoelectric cells across the medium to be tested, means for periodically interrupting those rays of said light that pass said medium in straight lines, unbroken in the inside of said medium, and an amplifier sensitive to the ratio between the variation of illumination on at least one of said photoelectric cells occurring at the rate at which said interrupting means periodically interrupt said rays and the average illumination on that cell.

19. An apparatus as claimed in claim 18 in which the light source or light sources and the photoelectric cell or photoelectric cells are located on one side of said medium to be tested and reflecting means are located on another side of said medium.

20. An apparatus for the detection of cloudiness of transparent media, comprising two light sources, at least one photoelectric cell having at least one photoelectric cathode, optical means adapted to direct across the medium to be tested light from one of said light sources toward said photoelectric cathode and light from the other light source so as to by-pass said photoelectric cathode, means to cause the light emission of one of said two light sources to periodically increase and decrease and means to cause the light emission of the other light source to increase when the light emission of the first named light source decreases and to decrease when the light emission from said first named light source increases, and an amplifier sensitive to the ratio between the variation of illumination on said photoelectric cathode occurring at the rate at which said light emission periodically increases and decreases and the average illumination on said photoelectric cathode.

JOSEPH C. FROMMER.

REFERENCES CITED

The following references are of record in the file of this patent:

UNITED STATES PATENTS

| Number | Name | Date |
|---|---|---|
| 2,254,548 | Ruhle et al. | Sept. 2, 1941 |
| 2,268,133 | Carlson | Dec. 30, 1941 |
| 2,287,322 | Nelson | June 23, 1942 |
| 2,339,053 | Coleman | Jan. 11, 1944 |
| 2,402,926 | Herschman | June 25, 1946 |

FOREIGN PATENTS

| Number | Country | Date |
|---|---|---|
| 705,975 | Germany | May 15, 1941 |